(12) United States Patent
Dupont

(10) Patent No.: US 9,278,757 B2
(45) Date of Patent: Mar. 8, 2016

(54) AIRCRAFT CABIN ENABLING PASSENGERS TO BE RECEIVED ON SEVERAL LEVELS AND CORRESPONDING AIRCRAFT

(71) Applicant: AIRBUS SAS, Blagnac (FR)

(72) Inventor: Willy-Pierre Dupont, Pibrac (FR)

(73) Assignee: Airbus (S.A.S.), Blagnac (FR)

( * ) Notice: Subject to any disclaimer, the term of this patent is extended or adjusted under 35 U.S.C. 154(b) by 0 days.

(21) Appl. No.: 13/655,843

(22) Filed: Oct. 19, 2012

(65) Prior Publication Data

US 2013/0119203 A1    May 16, 2013

(30) Foreign Application Priority Data

Oct. 19, 2011 (FR) .................................... 11 59454

(51) Int. Cl.
| | | |
|---|---|---|
| *B64C 1/18* | (2006.01) | |
| *B64D 9/00* | (2006.01) | |
| *B64D 11/00* | (2006.01) | |
| *B64C 1/00* | (2006.01) | |

(52) U.S. Cl.
CPC ... *B64D 9/00* (2013.01); *B64C 1/18* (2013.01); *B64D 11/00* (2013.01); *B64C 2001/0027* (2013.01)

(58) Field of Classification Search
CPC .............. B64C 2001/0018; B64C 2001/0027
USPC .................... 244/118.5, 118.6, 137.1, 137.2
See application file for complete search history.

(56) References Cited

U.S. PATENT DOCUMENTS

| | | | | |
|---|---|---|---|---|
| 2,281,581 A | * | 5/1942 | Horton | .......................... 105/327 |
| 4,055,317 A | | 10/1977 | Greiss | |
| 4,066,227 A | * | 1/1978 | Buchsel | ..................... 244/118.6 |
| 4,925,132 A | | 5/1990 | Zider | |
| 5,063,859 A | * | 11/1991 | Rader | ........................... 105/340 |
| 5,115,999 A | * | 5/1992 | Buchsel et al. | ............ 244/118.5 |
| 5,752,673 A | * | 5/1998 | Schliwa et al. | ............ 244/118.6 |
| 5,992,797 A | * | 11/1999 | Seidel et al. | ................ 244/118.5 |
| 6,237,872 B1 | * | 5/2001 | Bar-Levav | ................. 244/118.6 |
| 6,478,253 B1 | * | 11/2002 | Seidel | ........................... 244/119 |

(Continued)

FOREIGN PATENT DOCUMENTS

| | | |
|---|---|---|
| EP | 2 460 727 | 6/2012 |
| GB | 727 159 | 3/1955 |
| WO | WO 98/35876 | 8/1998 |

OTHER PUBLICATIONS

Bauhaus Luftfahrt, Paper, MTU Press Conference, Munich, Jul. 18, 2007.*

(Continued)

*Primary Examiner* — Tien Dinh
*Assistant Examiner* — Steven Hawk
(74) *Attorney, Agent, or Firm* — Jenkins, Wilson, Taylor & Hunt, P.A.

(57) ABSTRACT

An aircraft according to the invention enables passengers to be received and comprises a first deck for receiving passengers, a second deck for receiving passengers, which is placed over the first deck, as well as at least one access door. The first deck has at least one first zone having a substantially planar floor and situated on the same level as the access door and at least one second zone having a floor offset in height relative to the first zone. The cabin further comprises at least one rectilinear ramp linking the first zone of the first deck to the second zone of the first deck, and at least one rectilinear ramp linking the first zone of the first deck to the second deck.

20 Claims, 10 Drawing Sheets

(56) References Cited

U.S. PATENT DOCUMENTS

| | | | |
|---|---|---|---|
| 6,616,098 B2 * | 9/2003 | Mills | 244/118.5 |
| 6,705,567 B2 * | 3/2004 | Dong et al. | 244/13 |
| 6,772,977 B2 * | 8/2004 | Dees et al. | 244/118.1 |
| 7,536,958 B2 * | 5/2009 | Bravo et al. | 105/392.5 |
| 9,108,719 B2 * | 8/2015 | Sankrithi | B64C 1/20 1/1 |
| 2002/0033432 A1 * | 3/2002 | Mikosza | 244/118.6 |
| 2008/0251641 A1 * | 10/2008 | Sprenger | 244/118.5 |
| 2010/0206984 A1 | 8/2010 | Haefner | |
| 2013/0334368 A1 * | 12/2013 | Sankrithi | B64C 1/20 244/118.1 |

OTHER PUBLICATIONS

Bauhaus Luftfahrt, "Claire Liner", Presentation, ILA Berlin 2008 (Berlin Airshow, 2008).*

"Imagining the aircraft of the future", Prof. Dieter Schmitt / Bauhaus Luftfahrt, ASD Focus, Issue 04, Summer 2009, pp. 14-15.*

Prof. Dr. Mirko Hornung / Bauhaus Luftfahrt, "Aviation in 2030+: Visions, Concepts and Chances of Realisation", Nov. 23, 2011, Presentation, Royal Aeronautical Society, Toulouse Branch, pp. 26-29.*

French Search Report for Application No. FR 1159454 dated Jul. 23, 2012.

* cited by examiner

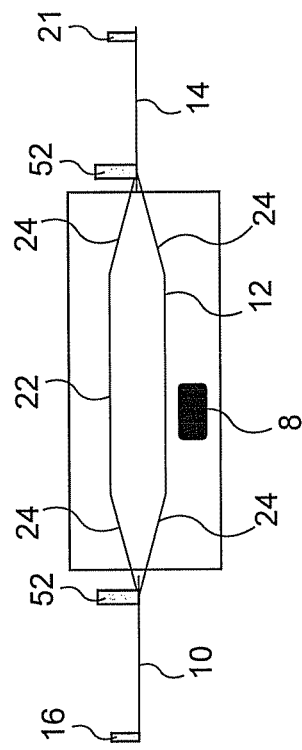
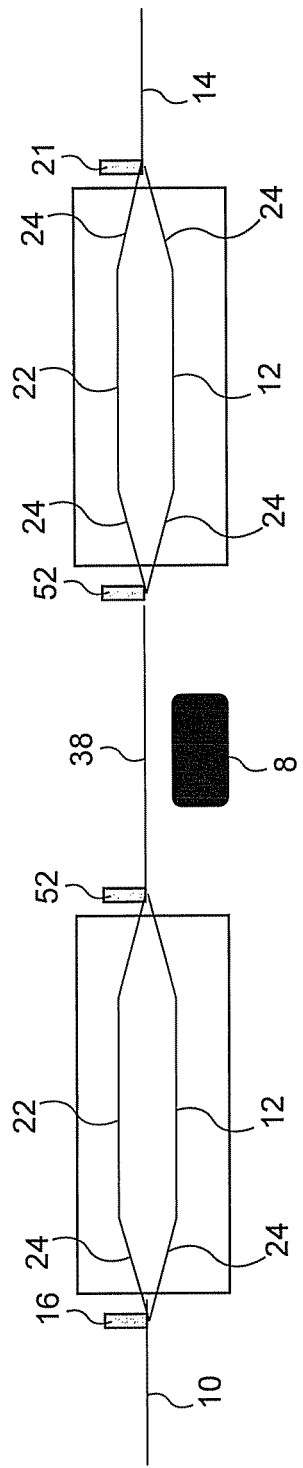

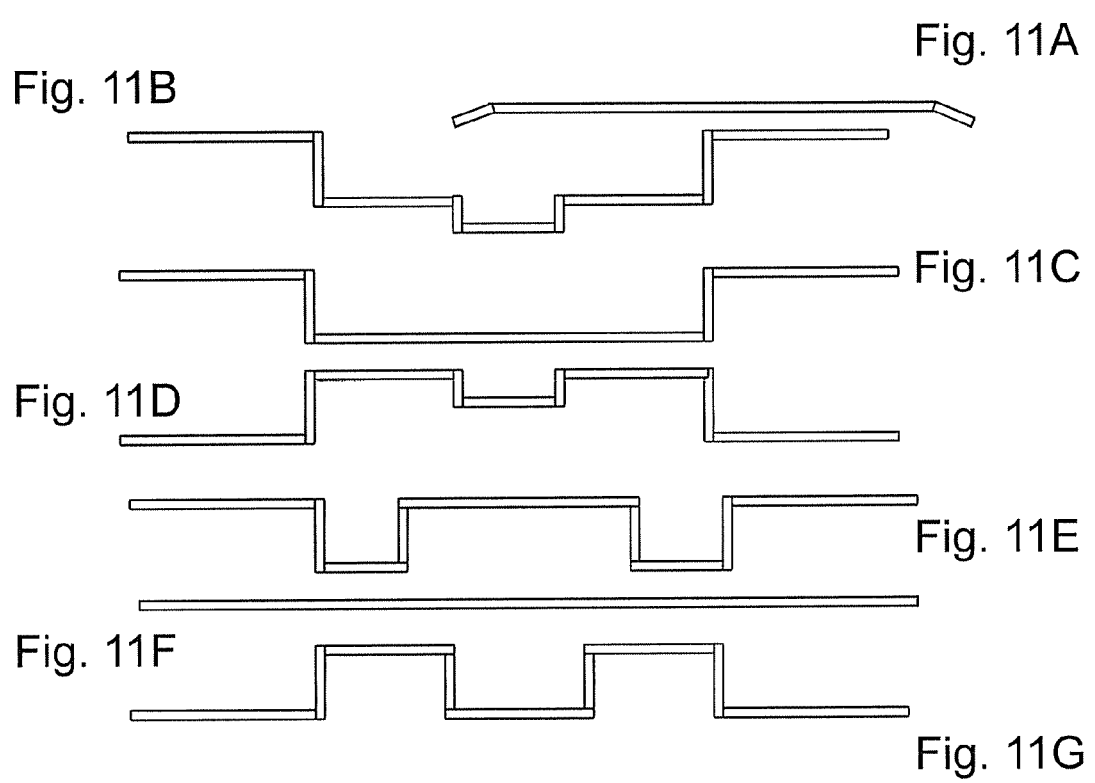

AIRCRAFT CABIN ENABLING PASSENGERS TO BE RECEIVED ON SEVERAL LEVELS AND CORRESPONDING AIRCRAFT

CROSS-REFERENCE TO RELATED APPLICATIONS

This application claims the benefit of and priority to French Patent Application No. 11/59454 filed Oct. 19, 2011, the entire disclosures of which are hereby incorporated herein by reference.

TECHNICAL FIELD

The present invention concerns an aircraft cabin enabling passengers to be received on several levels, and also a corresponding aircraft

BACKGROUND

The field of the present invention is the interior layout of an aircraft fuselage adapted for the commercial transport of passengers. Considered here are aircraft adapted for transporting a relatively high number of passengers, for example greater than 100.

SUMMARY

The conventional structure inside an aircraft for the transport of passengers generally comprises a fuselage of substantially circular cylindrical form inside which is disposed a deck which is horizontal (when the aircraft has landed on the ground) which serves as a floor for a cabin adapted to receive the passengers and also serves to provide separation between a hold, adapted for the transport of baggage and containers, and the aforementioned cabin. In certain aircraft (such as those commercialized under the trademark A380) a double deck is provided inside the fuselage. These are aircraft having a fuselage of very great width and height. The two decks are substantially planar and enabled two superposed cabins to be formed having in each case a ceiling height of the order of 2.50 m. They are linked by stairways and/or by elevators.

Some documents, such as EP-1 164 077 or for example the documents EP-0 780 335, or EP-0 514 650, or also U.S. Pat. No. 6,547,184, disclose aircraft structures having a large diameter fuselage enabling passengers to be received on two parallel decks disposed one over the other.

EP 2460727 describes an aircraft cabin comprising a first section comprising a lower deck and an upper deck, and a second section comprising an intermediate deck. A curved ramp links the lower deck to the intermediate deck, and a curved ramp links the intermediate deck to the upper deck. The embarkation and disembarkation of the passengers may be made entirely from the intermediate deck, which is provided with an access door. The three decks are each constituted by a planar surface, which surfaces are substantially parallel.

For aircraft of smaller size, in particular aircraft whose cabin is designed to receive passengers on a single deck and which has two longitudinal aisles enabling access to the seats of said passengers, it is known to produce, inside the cabin, a structure resting on the deck forming the floor of the cabin or else a structure suspended from the ceiling of the cabin to produce a mezzanine or the like. The documents EP-1 778 540 or U.S. Pat. No. 7,290,735 for example disclose such aircraft cabin layouts.

For these various types of aircraft, in particular those described previously and usually classified in the category of double deck aircraft or single deck aircraft with a double aisle, the usual layouts leave unused or poorly used spaces, thereby limiting the number of passengers able to have a place on a seat inside the aircraft cabin or the quantity of baggage or material which can be stocked in the cabin. In particular, in the aircraft described by EP2460727, considerable room is lost at the location of the ramps linking the three decks.

The hold height in these aircraft is usually provided to receive standardized baggage containers (or other things), known by the designations LD1, LD2 or LD3. These containers have a height of 1.62 m.

Another problem is the time necessary in an airport zone to conduct the embarkation and disembarkation of the passengers. Most often, there is no proper match between the characteristics of the passageways (aisles) and those of the access doors. The (theoretical) flow of passengers at the access doors is often greater than that in the aisles. The internal layout of such an aircraft thus penalizes the stopover time.

Starting with these findings, the present invention is thus directed to providing a solution making it possible to increase the passenger number capacity of an aircraft of a given size by optimizing the occupation of the space inside the fuselage of the aircraft. Advantageously, such a layout also enables a freer flow of the passengers within the aircraft cabin.

To that end, the present invention provides an aircraft cabin enabling passengers to be received comprising a first deck for receiving passengers, a second deck for receiving passengers, which is placed over the first deck, as well as at least one access door.

According to the present invention, the first deck has at least one first zone having a substantially planar floor and which is situated on the same level as an access door and at least one second zone having a floor offset in height relative to the first zone. Furthermore, at least one rectilinear ramp links the first zone of the first deck to the second zone of the first deck, and at least one rectilinear ramp links the first zone of the first deck to the second deck. As in EP2460727, the passengers may be distributed in part of the fuselage over two levels. It is thus possible to increase the capacity of the aircraft, for a given length (and cross-section of the fuselage), in terms of passengers. Furthermore, the fact that the passengers are distributed over two levels, enables freer movement inside the aircraft, which enables faster embarkation and disembarkation of the passengers.

To optimize the reception capacity of the aircraft cabin according to the invention, the second deck preferably extends over the major part of the second zone of the first deck.

As in EP2460727, to facilitate the movement of the passengers in an aircraft cabin according to the present invention, provision is made for ramps to link the first zone of the first deck to the second zone of the first deck and to the second deck. A ramp is used in preference to a stairway, or possibly an elevator, since if the slope is limited, it does not form an obstacle and thus does not penalize, or only slightly penalizes, the movement of passengers and/or service carts (usually called trolleys) in comparison to a horizontal aisle.

However, the cabin according to the invention is distinguished from the cabin of EP2460727 in that its ramps are rectilinear. The direction of each ramp is preferably a straight line, or may, as a variant, follow a broken line (several portions of straight line not parallel to each other). As may be understood on reading the present description, this configuration enables the occupation and the layout of the cabin to be optimized. To be precise, the space around the ramps may be used to receive seats or stowage units. That space is lost with the curved ramps proposed by EP2460727.

What is more, the movement of trolleys or baggage with wheels is easier on rectilinear ramps than on curved ramps. The same applies for persons, which enables the embarkation/disembarkation times to be reduced and may prove crucial in case of emergency evacuation of the aircraft.

In a preferred version, and contrary to the cabin known from EP2460727, the first zone of the first deck lacks any passenger seat between the access door and the ramps. This first zone may thus be exclusively a passage zone and may possibly be a service zone, which may include service furniture, called galleys separated by aisles. It is not however ruled out to provide seats of folding type in this zone for the commercial cabin crew and/or sites for receiving wheelchairs with anchorage means therefor, enabling passengers with reduced mobility to be received who thus travel in their own wheelchair. With such a configuration, the embarkation of passengers is made practically without slowing at the access door. The passengers then spread over the first zone of the first deck, in a flow heading for the second zone of the first deck via a first ramp and a flow heading for the second deck via a second ramp. This spreading takes place in a more spacious zone than that available in the cabin of EP2460272 and by taking passageways for which there is no risk of being blocked by a passenger in course of taking a seat. The rectilinear ramps used in a cabin according to the invention are advantageously such that they have a slope of approximately 20%, for example between 10 and 30% and preferably between 15 and 25% (here there is for example a difference of level of the order of 0.45 m to 0.75 m over a length measured longitudinally in the aircraft of 3 m or another possibility is 0.75 to 1.25 m for a length of 5 m). This slope corresponds to a slope when the aircraft has landed on the ground and the decks are substantially horizontal.

In a conventional manner, a cabin according to the invention comprises aisles. Advantageously, each ramp (24) enters an aisle and extends in the same direction as it. Preferably, aisles and ramps all extend in the roll direction (or longitudinal direction) of the aircraft. Preferably, the second zone (12) of the first deck and the second deck comprise columns of seats against the fuselage, contrary to the cabin of EP2460727 which comprises aisles along the fuselage, that is to say at the location of greatest curve and least height. In a preferred version, the second zone (12) of the first deck comprises two aisles 20 each separating a lateral zone of seats, which may comprise one or more columns of seats) and a central zone of seats preferably comprising several columns of seats.

The presence of seats against the fuselage enables space to be saved and to provide numerous passengers with the possibility of seeing the countryside through windows.

An advantageous embodiment provides for the first deck to have a third zone aft of its second zone and having a substantially planar floor that is offset in height relative to the second zone of the first deck. This embodiment provides the possibility of having only one door at the rear of the aircraft whereas it would otherwise be necessary to provide a door at the location of the second zone of the first deck and a door at the location of the second deck. In this embodiment, the third zone and the first zone are both advantageously located at substantially the same level. Doors may thus be provided at the front and back of the aircraft also at the same level. In side view, the cabin schematically presents a shape reminiscent of a hexagon: two opposite sides of the hexagon correspond to two zones receiving the passengers—second deck and second zone of the first deck—two other sides correspond to the access between the first zone of the first deck and the zones receiving the passengers and the last two sides correspond to the access between the third zone and the zones receiving the passengers.

To produce the second deck, it may be provided for it to have a floor structure with a complex profiled form having different longitudinal zones, extending longitudinally, disposed at different levels, these longitudinal zones being planar and linked by substantially vertical walls, bounding either seats or aisles. Preferably, said zones extend over the entire length of the second deck or at least from the first row of seats to the last. Advantageously, the difference in level between one longitudinal zone forming an aisle and a contiguous longitudinal zone receiving seats is less than 0.60 m, so as to limit the step height that a passenger must negotiate (going up or down) to pass from one zone to another and thereby to avoid any fall in case of precipitate evacuation.

This embodiment is of low bulk, enabling very diverse forms to be produced, and is thus very well adapted here to the optimization of the cabin space. Such a floor structure is original in itself and advantageous independently of the other features of the invention; it may also be used in other layout configurations of the aircraft cabin (a single deck, several decks, with or without a ramp, etc.) and in particular in a known aircraft.

The complex floor structure of the second deck may for example be a molded structure produced in a carbon-based composite material. The second deck may then advantageously rest on intermediate parts which are disposed laterally and which bear on the first deck. The complex floor structure is for example such that it comprises at least three longitudinal zones each having a different level to that of another zone considered. For better strength properties while maintaining smaller thickness, such a complex floor advantageously comprises transverse stiffeners.

For better passenger comfort and for a good compromise as to the management of space in the cabin, the available height between the second zone of the first deck and the second deck is preferably comprised between 1.20 m and 2.20 m. When the height is in the lower range indicated, the corresponding space is used to accommodate baggage for example. When the height is in the upper range, the corresponding space is for example used as an aisle.

The second zone of the first deck advantageously has a substantially planar floor. This embodiment is easier to produce. It also corresponds to the form of the "ceiling" of a hold which is generally substantially planar.

The present invention also concerns an aircraft adapted for the transport of passengers, characterized in that comprises an aircraft cabin as described above. In such an aircraft, the first deck advantageously has a third zone having a substantially planar zone located offset in height relative to the second zone of the first deck, and being situated at the rear of the aircraft.

Such an aircraft conventionally comprises a wing. The latter is for example located under the first deck adjacent the second zone when the height of the wing is limited. For an aircraft of greater capacity and thus with a bigger wing, the first deck advantageously has a third zone having a substantially planar deck located offset in height relative to the second zone of the first deck, and the third zone is situated above the wing of the aircraft. In such an aircraft, a configuration may be found aft of the wing that is similar to that forward of the wing. Such an aircraft is then such that, above the wing and aft thereof, the first deck also has a configuration having a first zone, a second zone and a third zone, the second zone being offset relative to the first zone and to the third zone. In schematic side view there is to be found a double hexagon cabin shape (as explained above), a first hexagon forward of the wing and a second hexagon aft thereof.

The present invention is more particularly adapted for an aircraft such as that described above when said aircraft has a fuselage whose equivalent diameter is greater than 4.50 m. Aircraft are considered here having a cross-sectional area at least of the order of 15.9 m², which area corresponds to the area of a circle of 4.5 m in diameter.

BRIEF DESCRIPTION OF THE DRAWINGS

Details and advantages of the present invention will emerge more clearly from the following description, which is made with reference to the accompanying diagrammatic drawings in which:

FIG. 9 is a very schematic side view illustrating the present invention applied to a medium-haul aircraft, FIG. 10 corresponds to FIG. 9 for a long-haul aircraft, FIGS. 11A to 11G illustrate transverse cross-sections of an upper deck floor which may be used according to the present invention in an aircraft.

DETAILED DESCRIPTION

Figure 1:
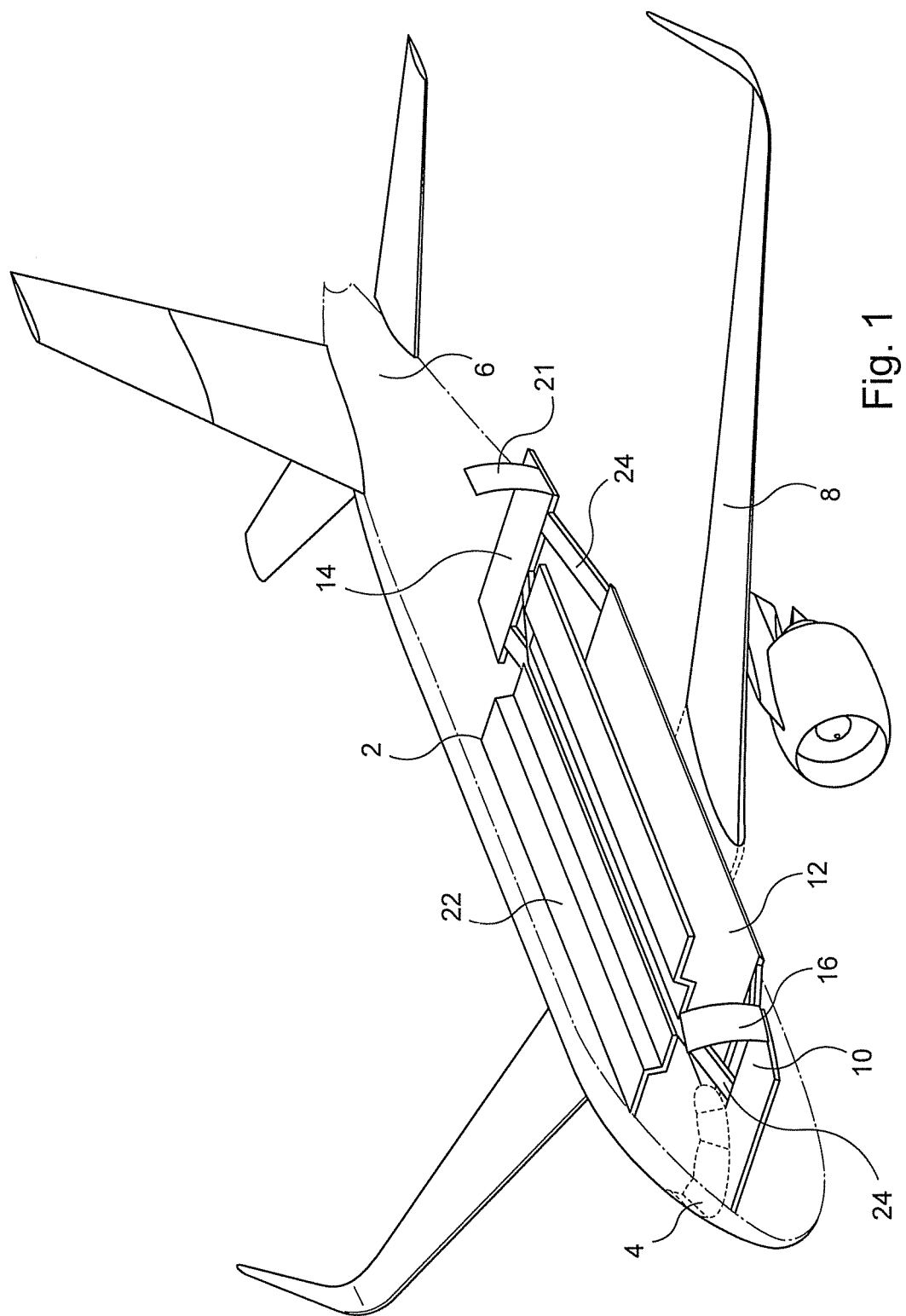
FIG. 1 is a perspective view of an aircraft in which transparency is used to show a portion of internal aircraft structure.

FIG. 1 is a schematic representation of an aircraft of medium-haul type. This figure is based on an aircraft commercialized by the Airbus company under the registered trademark A321.

It does not appear to be useful here to represent a figure similar to FIG. 1 for an aircraft of A321 mark as it currently exists. In such an aircraft, within the fuselage, a single deck extends from the cockpit to the rear of the aircraft forming a planar floor having a single level over the whole length of the aircraft. This deck separates the fuselage into two zones, a lower zone used for its major part as a hold adapted to receive baggage and/or freight and an upper zone which is adapted to receive the cockpit for piloting the aircraft and to receive a cabin to receive passengers as comfortably as possible during their voyage.

In the solution provided by the present invention in FIG. 1, there is thus to be found an aircraft having a fuselage 2 at the front of which is to be found a cockpit 4 and which ends at the rear with a zone generally called tail cone 6.

The part of the fuselage of particular interest in the present invention is situated between the cockpit 4 and the tail cone 6. In this zone the fuselage generally has a circular cylindrical form of substantially constant cross-section. This zone of the aircraft is conventionally adapted to receive the passengers, their baggage and also possibly goods. It is also in this central zone of the fuselage of the aircraft that a wing 8 is joined to the fuselage.

In FIG. 1, as for the other Figures, it is assumed that the fuselage, at least in the part of interest to us, has a substantially circular cross-section and that the wing 8 is joined to the fuselage in a low position. However, the present invention may apply to other fuselage cross-sections, bi-lobed and/or to other wing mounting layouts. In general terms, the present invention is more particularly directed to aircraft of which the cross-section, at the location of the cabin receiving the passengers, has a diameter equivalent to 4.5 m. This means that preferably the cross-section of the fuselage has at that location an area greater than or equal to the area of a circular cross-section of 4.5 m in diameter, that is to say an area of the order of the order of 16 m² or more.

The cockpit 4, adapted to receive a pilot and his co-pilot, is equipped with all the command and control instruments enabling the aircraft to be piloted. It is assumed here that the cockpit 4 is similar to a cockpit of the prior art, that is to say in the present example, that the cockpit 4 is similar to the cockpit of an A321 (registered trademark).

This cockpit 4 then comprises a floor (not shown here). The floor of the cockpit 4, in an A321 (registered trademark), it integrated into the single deck described above. Such a floor is for example also to be found in an aircraft according to the present invention.

In the aircraft represented in FIG. 1, it can be noted that, as in an aircraft of the prior art, there is also structural separation between a lower part of the aircraft adapted to receive in particular baggage and/or goods and to accommodate various technical equipment (avionics hold, etc.) and an upper zone in which are accommodated the pilot and the co-pilot (cockpit 4) and the cabin crew, and in which are also accommodated the passengers (aircraft cabin). This structure forming the separation is in the present application called first deck by analogy with the deck of an aircraft generally called "single deck aircraft".

As can be noted in FIG. 1, the first deck of the aircraft according to the invention has principally three zones, a first zone 10 at the front of the fuselage, just behind the cockpit 4, a second zone 12 extending over the major part of the length of the aircraft cabin, and a third zone 14 located at the back of the fuselage 2 which may possibly extend as far as the inside of the tail cone 6.

The first zone 10 of the first deck extends in line with the floor of the cockpit 4. For example a common structure forms the cockpit floor 4 and that first zone 10.

In entirely conventional manner, a door 10 is to be found adjacent that first zone, referred to as first door 16, which is used for the embarkation and disembarkation of the passengers. This first door 16 is for example similar to a first door of an aircraft of registered trademark A321 and also called C type door. It may also be a larger door, for example such as an aircraft door called type A door. The positioning of the first door 16, relative for example to the fuselage 2, is also similar to what is known from the prior art. Of course, the scope of the present invention would not be departed from by modifying the structure of the first door of the aircraft and/or its positioning (provided this first door opens onto first zone of the first deck).

Thus, a passenger who boards the aircraft passes by the first door 16 and arrives onto the first zone 10 of the first deck.

In the whole description of the present patent application, is will be assumed that the aircraft is on the ground, the ground being considered as planar and horizontal. The references up/down are made relative to an aircraft located in such a position. The references front and back are made relative to a longitudinal axis of the aircraft corresponding to the longitudinal axis, or roll axis of the aircraft, whereas the concepts of left/right are defined relative to the direction of movement of the aircraft in flight.

Figure 2:
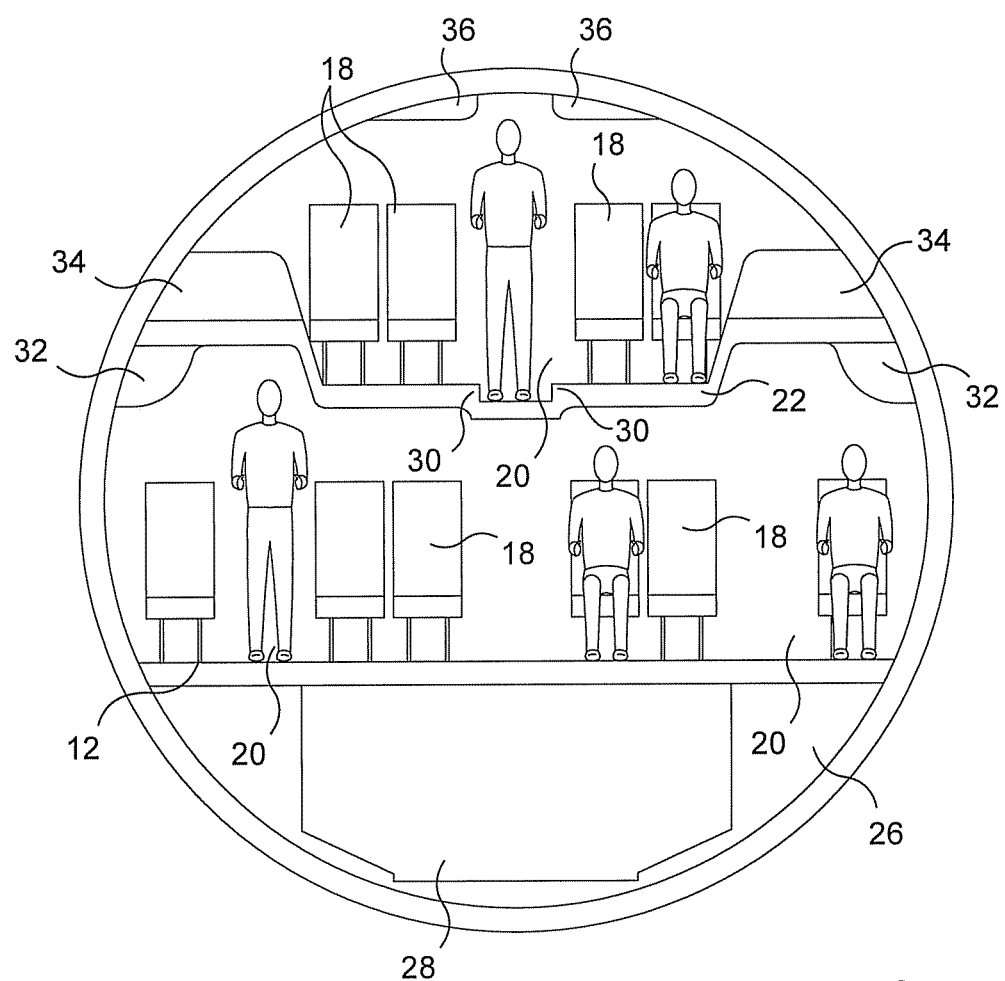
FIG. 2 is a schematic view in transverse cross-section through the fuselage of the aircraft represented in FIG. 1.

The second zone 12 of the first deck is situated aft of the first zone 10 and below it. It takes the form of a zone whose upper surface is substantially planar and horizontal. It thus forms a floor able to receive seats 18 (FIG. 2) which may be accessed by virtue of aisles 20 (FIG. 2).

For the second zone 12 of the first deck there is again found here a structure substantially similar to a single aircraft deck of the prior art. However, compared with an aircraft of the prior art, the space dedicated to baggage and/or goods is reduced in favor of space available for the cabin, and thus for the passengers and for their comfort.

The third zone 14 is also a zone defining a substantially planar floor. This third zone disposed at the rear of the fuselage 2 is for example disposed at the same height as the first zone 10. In this way, the first zone 10 and the third zone 14 may correspond to the forward part and respectively to the aft part of a single deck of an aircraft of the prior art.

As may be seen in the drawings, over the second zone 12 is located an upper structure referred to hereinafter as second deck 22. The latter has a general shape profiled along the longitudinal axis (roll axis) of the aircraft. Generally it has planar longitudinal zones disposed at different levels and connected together by vertical or inclined walls.

In the same way as the first zone 10 is situated adjacent the first door 16, the third zone 14 of the first deck is located adjacent a rear door 21. The latter for example corresponds to a rear door of an aircraft of the prior art. As for the first door 16, the scope of the invention will not be departed from by providing a rear door of different form and/or position relative to an aircraft of the prior art.

As regards the first door 16, in the same way as for the rear door 21, this may in each case be the sole door represented in the drawings. However, usually in aeronautics, when reference is made to a door, there are in fact a pair of doors which are symmetrically disposed to the right and left of the fuselage of the aircraft.

In original manner, the present invention provides for access to the second zone 12 of the first deck and to the second deck 22 using rectilinear ramps 24. In the same way as explained earlier, where it is indicated that seats 18 and aisles 20 are provided in the second zone 12 of the first deck, seats 18 and one or more aisles 20 are also to be found again on the second deck 22. On the other hand it can be noted that the first zone 10 and the third zone 14 lack passenger seats between the corresponding access door 16, 21 and the ramps 24 (providing seats, for example of folding seat type, for the cabin crew in one or both of these zones is not ruled out). Each aisle 20 of the second zone 12 of the first deck and each aisle 20 of the second deck 22 in each case communicates with a rectilinear ramp 24 at the front and another one at the rear. There are thus to be found rectilinear ramps 24 linking the first zone 10 of the first deck to the second zone 12 of the first deck, rectilinear ramps 24 linking the first zone 10 of the first deck to the second deck 22, rectilinear ramps 24 linking the second zone 12 of the first deck to the third zone 14 of the first deck and rectilinear ramps 24 linking the second deck 22 to the third zone 14 of the first deck.

The length of the ramps is chosen so as to have a ramp slope which is not to great. It is necessary for the passengers to be able to climb and descend the ramps 24 without difficulty and it is also necessary for the cabin crew to be able to take up and down trolleys or half-trolleys, such as those usually used for the service of meals and/or beverages. The slopes of the ramps are for example approximately 20%, for example comprised between 15 and 25%.

Provision is thus made to achieve a change in level of the order of 20 cm for a length of 1 m, the latter length being measured along the longitudinal axis of the aircraft. By way of non-limiting examples, a ramp is for example provided extending over 3 m along the roll axis to achieve a change in level of 0.65 m or else a ramp of 5 m length to enable a change in level of 1.1 m.

The presence of ramps enables it to be avoided to have elevators and/or stairways. They enable movement in the aircraft to be made free, the fact that they are rectilinear enhancing this result still further. It is however not ruled out to provide a stairway or an elevator in the aircraft. A ramp may even be envisioned for example for which each edge is constituted by inclined planes and the center by stairway steps.

To produce the second deck 22, and possibly also the first deck, it is possible to use structures molded from carbon. Such structures are then optimized according to the load to bear and the shape of the floor. A floor produced in this way may have several different levels to adapt the space above and below the floor as well as possible. As will be seen later, it is advantageous for example to have at least three different levels to optimize the space at the location of not only the seats and the aisles but also at the location of the places for baggage stowage. With such materials relatively thin floors can be achieved by integrating for example transverse stiffeners.

The structure of the first deck and the structure of the second deck 22 rest on fuselage frames and are adapted to bear seats. It is to be recalled here that the frames of a fuselage are parts which form the primary structure of a fuselage. These annular parts are linked to each other by longerons and carry an outer skin of the aircraft as well as structural members within the aircraft. The link with the frames is for example provided in order for press fitting by insertion with an intermediate part having the form of an arc of a circle along the wall of the fuselage, to bear in particular the second deck 22. Demountable floor fasteners of nut-and-bolt type, of nylon or metal, are advantageously used (cf. FIG. 12 and the corresponding description later).

To produce not only the second deck 22, but also the first deck, it may be provided for the parts molded from carbon to extend over the entire width of the cabin in the transverse direction and to extend over two, three or four frames in the longitudinal direction. Two successive parts forming a floor fit together by insertion for example of one into the other. To stiffen the structure, it may be provided to link the second deck to the first deck for example by vertical feet located in the center of the cabin. Such feet are not shown. They may be used for the fitting out of the cabin for example supporting coat stands. They are preferably disposed such that they do not obstruct the transverse movements of passengers, in particular so as not to hinder an evacuation of the cabin.

FIG. 2 is a schematic representation of a transverse cross-section through the fuselage of the aircraft shown in FIG. 1 at the location of the second zone 12 of the first deck. At this location the second deck 22 is also to be found. In this cross-section example, ten passengers may travel abreast and the access to the seats is made by three aisles disposed on two distinct levels.

The presence of a hold 26 can be noted under the first deck, and to be more precise under the second zone 12 of the first deck. As mentioned above already, the volume of this hold is less than the volume of a hold encountered on aircraft of the prior art having equivalent dimensions. This hold nevertheless enables containers 28 to be received. They are for example standardized containers of LD3-45W type (whereas in a prior art aircraft it is provided to receive standardized containers in the hold that are of LD1, LD2, LD3 or LD6 type).

As already mentioned above, the second zone 12 of the first deck has a substantially planar floor. In the embodiment represented here, it is provided to dispose seats 18 here which are disposed in transverse rows and longitudinal columns, as is conventionally the case in an aircraft for the transport of passengers. In this FIG. 2, it provided to dispose six seats abreast, those seats being accessed from two aisles 20. Thus each time there is, at the side of the fuselage 2, a longitudinal column of seats 18 and at the center of the fuselage there are two double columns of seats 18 separated by a stowage space. A 1, 4, 1. type configuration is thus attained. Such a configuration has the advantage that each passenger may come to sit down or may get up and move within the aircraft, by having to say "excuse me" to a maximum of only one neighbor.

For the second deck 22, it is provided here to dispose the seats 18 in transverse rows and longitudinal columns. Provision is made here to dispose four seats abreast accessed by a central aisle 20. This is thus a configuration of type 2, 2. In such a configuration, the passengers located nearest the fuselage in seated position have to say "excuse me" to one neighbor when they wish to come to sit down or leave their seat (a configuration also called "single excuse-me").

On the second deck 22, as the ceiling height is limited, provision is made to dispose the floor of the aisle 20 at a level such that it makes it possible to have for example a height under the ceiling of the order of 2.10 m. The aisle 20 is located here in median position and is disposed over the stowage space located between the two double columns of seats 18 situated in the second zone 12 of the first deck. The fact that the floor of the aisle 20 of the second deck 22 is disposed at a lower level and encroaches on the space below of the second deck 22 is not detrimental to the comfort of the passengers of the first deck. The stowage space may be used to dispose stowage furniture serving as baggage compartments for the passengers traveling on the seats 18 of the central double columns. As the height is sufficient, it may even be envisioned to create spaces for keeping garments here enabling jackets and/or coats to be hung up.

The floor, underneath the seats 18 of the second deck 22, is situated at a height greater than that of the aisle 20. The passengers passing from the aisle to the seats 18 on the second deck 22 must therefore negotiate a small step 30, which preferably does not exceed 0.60 m in height. In the illustrated example, it measures only a few centimeters. It should be noted that each of the longitudinal zones extending on opposite sides of the central aisle 20 is planar; in other words, the floor under each double column of seats 18 is planar, contrary to what is proposed in US2002/0033432 in which each zone of seats has a complex floor the level of which varies in the longitudinal direction. The absence of difference in levels in the longitudinal direction in the second deck according to the invention in the zones of seats enables conventional seats, on legs, to be used. The free space under such a seat serves to accommodate a life jacket as well as the legs (and possibly a handbag) of the passenger seated just behind. In US2002/0033432, the space situated under the seat-rest of each seat of the upper deck is not available for the users of said seats; it is taken over to increase the height under the ceiling of the lower deck between the rows of seats, which proves to be of little usefulness. The configuration according to the invention with planar longitudinal zones, in particular zones of seats, enables the use of the cabin space to be optimized.

Between the seats 18 of the second deck 22 and the fuselage 2, it is provided in the embodiment of FIG. 2 to dispose the second deck 22 at approximately 0.50 m above the level of the floor of the neighboring zone of seats 18. The second deck 22 for example extends substantially at the height of the seat-rests of the seats 18. As illustrated in FIG. 2, this position makes it possible to provide under the second deck the presence of baggage compartments 32 and on the second deck 22, between the seats 18 and the fuselage 2, stowage units 34 for baggage. Shelves 36 may also be provided above the seats 18 of the second deck 22 for example to receive articles of clothing and/or small parcels.

Figure 3:
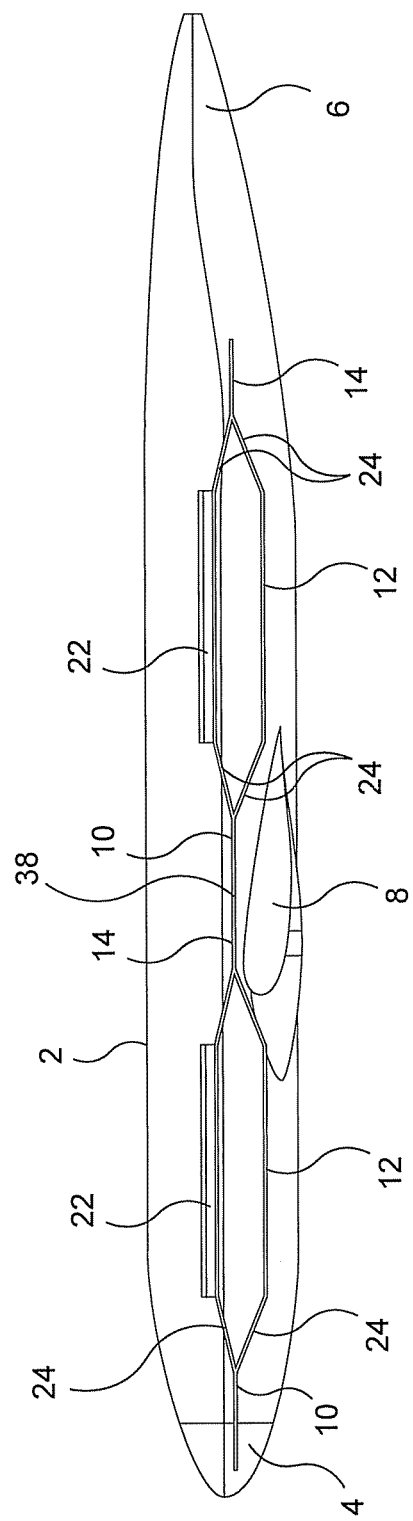
FIG. 3 is a side view of an aircraft according to the present invention, said aircraft having a larger wing than the aircraft represented in FIGS. 1 and 2.

FIG. 3 shows a side view of a long-haul aircraft fuselage of larger size than the aircraft represented in FIGS. 1 and 2. The same references are adopted here as those used earlier to designate similar parts. Again there is to be found here at the front of the fuselage 2 a cockpit 4 and at the rear of that fuselage 2 a tail cone 6. There is a larger wing 8 here than in the embodiment of FIGS. 1 and 2. On account of this, the second zone 12 as described earlier cannot extend at the location of the wing 8. It is then provided to have a second deck 22 forward of the wing 8 and aft thereof. There is again to be found here forward of the wing and aft thereof in each case a configuration entirely similar to that described earlier. The first deck thus here has two first zones 10: one located just behind the cockpit 4 and the other above the wing 8, at the back thereof. Also to be found again here are two second zones 12, one forward of the wing 8 and the other aft of it. Similarly, two third zones 14 are provided, one above the wing 8, forward thereof, and the other in the vicinity of the tail cone 6. The third zone 14 and the first zone 10 situated above the wing 8 are merged into a zone called hereinbelow intermediate plateau 38.

Figure 4:
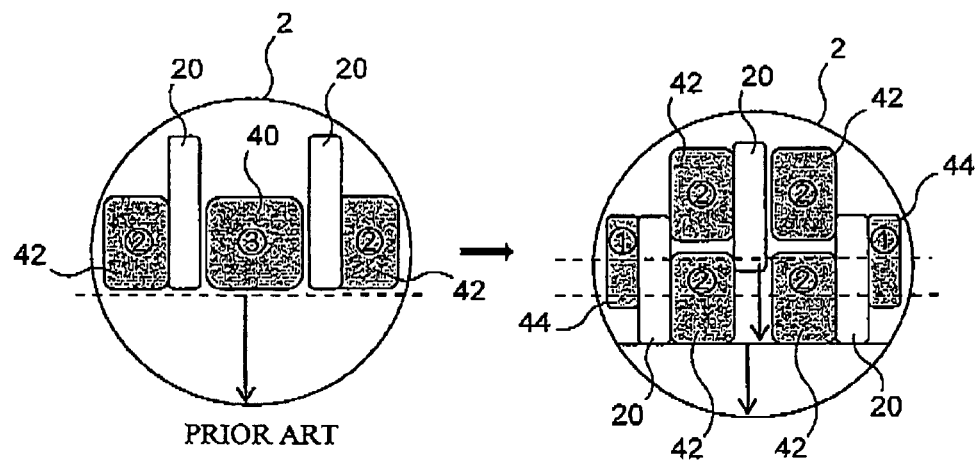
FIG. 4 is a schematic view of two transverse cross-sections of fuselages enabling an aircraft internal layout of the prior art to be compared with an aircraft internal layout according to the present invention.

FIG. 4 illustrates the present invention by comparing a conventional configuration in an aircraft of the prior art (seven passengers abreast and two aisles on a deck) with a variant of the configuration given in FIG. 2 (ten passengers abreast and three aisles on two decks). In both cases, an aircraft is provided having a substantially circular cylindrical fuselage of a diameter of the order of 5 m. On the left of FIG. 4, in a double-aisle configuration, a group 40 of three columns of seats is to be found at the center. Laterally, adjacent the fuselage 2, is to be found on each side a group 42 of two columns of seats. In each case an aisle 20 separates the group 40 of three columns of seats from a group 42 of two columns of seats. In this configuration, the aircraft can carry a pair of containers of type LD2 in its hold 26, below the single deck.

On the right of FIG. 4, a cross-section of an aircraft fuselage according to the present invention has been represented schematically, said aircraft having a substantially circular cylindrical fuselage 2 of a diameter of 5 m. This configuration represents that described with reference to FIG. 2 but illustrated more schematically and with a variant. It can be noted here that there are four groups 42 of two seats. Furthermore, there are also two columns 44 of one seat. Relative to the embodiment of FIG. 2, the seats of the columns 44 are raised so as to dispose the passengers taking those seats at the level in the fuselage at which its width is greatest. In this way, the comfort of the passengers is improved. It is thus managed to dispose ten seats abreast in the same section of fuselage with entirely equivalent comfort. Admittedly, the hold 26 is of reduced size but, as indicated above, it nevertheless enables standardized containers of LD3-45W type to be accommodated. The floor of the second deck 22 has a form adapted to leave sufficient space for the passengers sitting down on the seats of the columns 44. The form of this floor is adapted to optimize both the space on the first deck and on the second deck.

Figure 5:
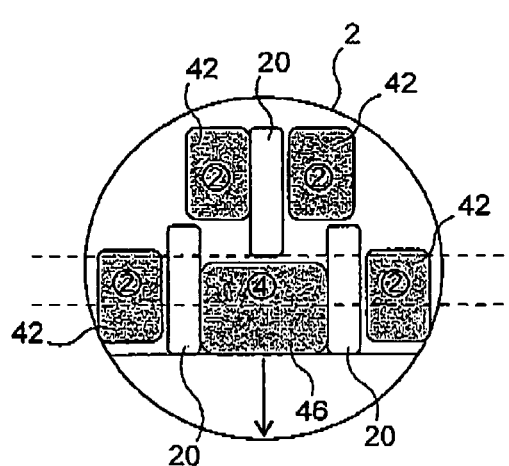
FIGS. 5 and 6 are similar views to the views of FIG. 4 for aircraft of greater fuselage diameter than the fuselage diameter of the aircraft concerned by FIG. 4.
Figure 6:
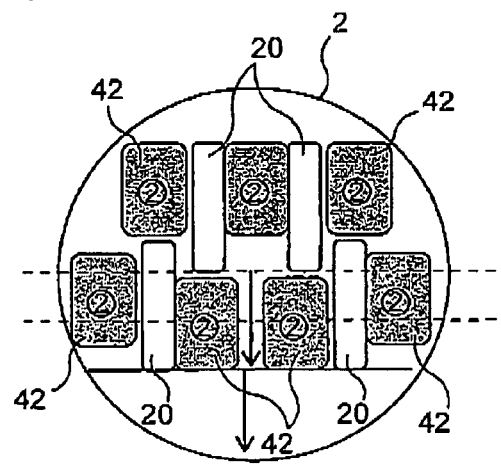

FIGS. 5 and 6 have configurations that may be envisioned for aircraft having a greater diameter of fuselage. FIG. 5 thus illustrates a configuration for a fuselage for example having a diameter of the order of 5.60 m. Here it is managed to accommodate twelve passengers abreast on two decks. In the configuration represented, it is provided to have eight passengers abreast in the second zone 12 of the first deck and four passengers abreast on the second deck. On the first deck, the passengers are distributed in a 2, 4, 2 configuration. In the center there is thus a group 46 of four columns of seats disposed between two groups 42 of two columns of seats, an aisle 20 separating in each case the group 46 of four columns of seats from a group 42 of two columns of seats. On the second deck 22, there are two groups 42 of two columns of seats separated by an aisle 20.

In FIG. 6, the diameter of the fuselage is for example 6.10 m. It is thus managed to accommodate fourteen passengers abreast in this section of fuselage. All the seats are disposed in groups 42 of two columns of seats. On the first deck, in the second zone 12, there are two groups 42 of two columns of seats separated in each case by an aisle 20. Between the two groups 42 located at the center of the first deck, a stowage space may be provided like the corresponding space described with reference to FIG. 2. It may be noted that the two lateral groups 42, located nearest the fuselage, are raised relative to the central two groups 42. The floor of the first deck may here be planar or else be raised too under the corresponding seats. Preferably, the steps created in the second case do not exceed 0.60 m in height. In this way, the lateral two groups 42 are located nearest the zone of maximum width of the cabin and the passengers thus benefit from more space.

By adopting the teaching of the present invention, it is possible to obtain other configurations for other diameters of fuselage. It is thus possible for example to have sixteen passengers abreast on two decks with a fuselage diameter of 6.6. m or still other variants with eleven, thirteen, fifteen, seventeen, or eighteen passengers abreast on two decks with three or four aisles. The groups of columns of seats may comprise from one to six columns of seats.

In each of the configurations illustrated by way of non-limiting example in the drawings, in particular in FIGS. 4 (right-hand figure) to 6, the form of the floor of the second deck may be adapted and may have numerous different levels (in the transverse direction) so as to optimize not only the space at the location of the aisles 20, and of the seats but also of the stowage spaces for baggage (in each case at the location both of the first deck and of the second).

Figure 7:
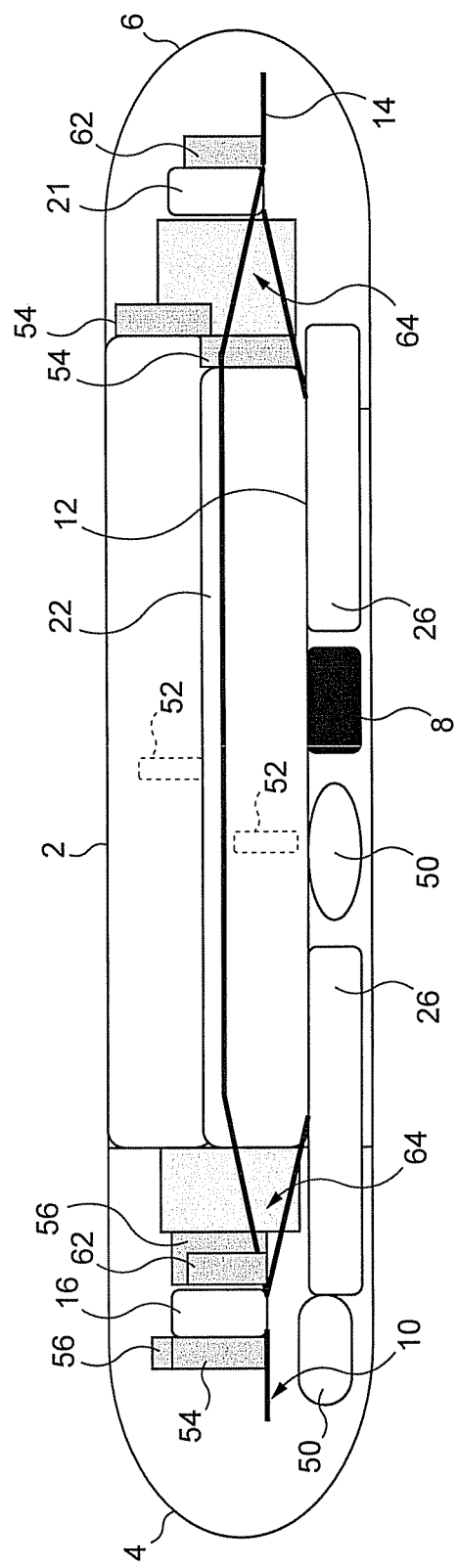
FIG. 7 is a schematic side view of an aircraft cabin layout according to the present invention, FIG. 8 corresponds to a view from above of the cabin shown in FIG. 7.
Figure 8:
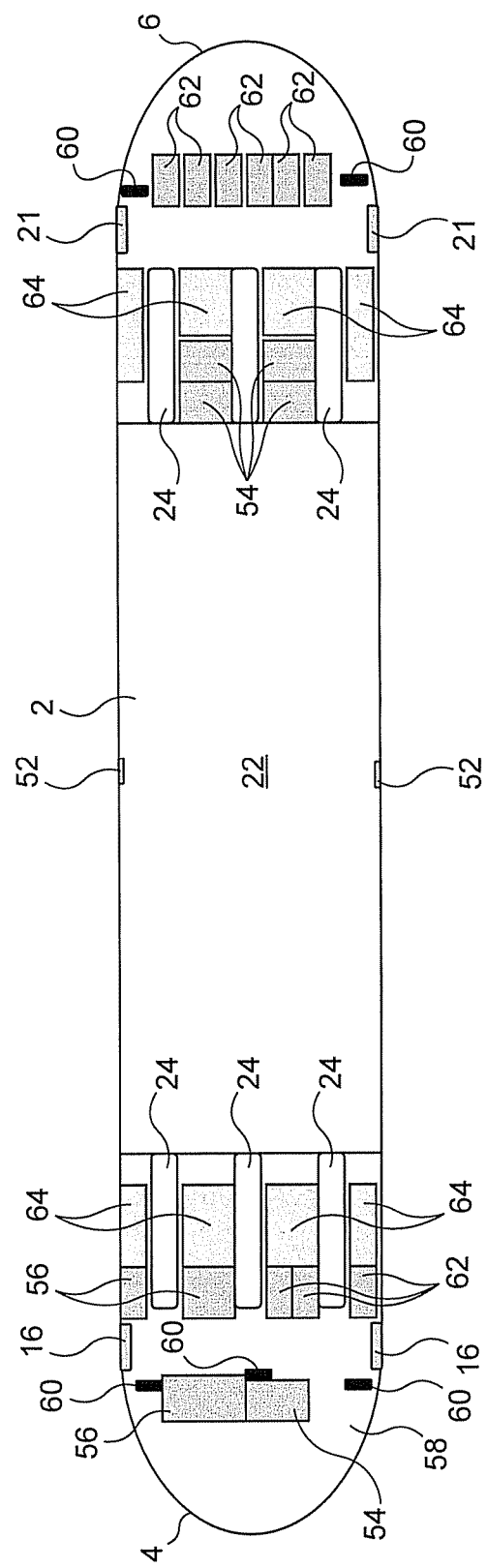

FIGS. 7 and 8 illustrate schematically from the side and from above a possible layout for an aircraft according to the present invention. An aircraft of medium-haul type has been taken here such as that represented in FIGS. 1 and 2. In a long-haul aircraft, such as that illustrated in FIG. 3, it is possible to have twice over a layout similar to that represented in FIGS. 7 and 8, a similar layout being disposed forward of the wing and the other aft thereof.

FIGS. 7 and 8 are provided to illustrate the layout at the location of the rectilinear ramps 24, the layout at the location of the second zone 12 and of the second deck 22 having been described earlier.

In FIG. 7, in the lower part of the fuselage 2, in addition to the wing 8, or to be more precise the connection thereof to the fuselage, there has been represented holds 26 (a forward hold and an aft hold) and also housings 50 to receive landing gear.

At the location of the cabin, the first door 16 and the rear door 21 are to be found. Intermediate doors 52 have been represented in dashed line. The presence of such doors is necessary if the distance between the first door 16 and the rear door 21 is greater than 60 feet (i.e. approximately 18.29 m.

At the front of the aircraft, behind the cockpit 4, there may be provided in a conventional manner a toilet 54 and a space 56 enabling stowage of food and beverages and possibly for preparing meals, such a space 56 generally being called a galley.

FIG. 7 enables the location of the different parts described to be identified along the length of the aircraft and also in terms of height. FIG. 8 in turn enables identification of the positioning of the parts described in relation to the length of the aircraft and in terms of the width thereof. It can be seen in particular that the toilet 54 and the galley 56 located just behind the cockpit 4 are juxtaposed to each other. FIG. 8 thus also illustrates a corridor 58 for access to the cockpit. In this FIG. 8 are also represented the locations of seats 60 (folding seats) provided for the commercial cabin crew and used in particular during the phases of take-off and landing of the aircraft. Just behind the first door 16, on the left side of the aircraft, that is to say the side by which embarkation and disembarkation of the passengers is usually made, are located sites 62 arranged more particularly to receive disabled persons using wheelchairs for locomotion. These sites 62 may be equipped for securing in place a wheelchair. This enables a disabled person to travel on his or her own wheelchair without having to be transferred from the wheelchair to a seat during embarkation (and from the seat to the wheelchair on disembarkation). The ramps 24 may be commenced just behind the first door 16 and the corresponding galleys 56, and in the same way the sites 62, may be located at least partially at the same distance (measured along the roll axis of the aircraft) as the ramps 24.

Aft of the galleys 56 and of the sites 62, it is for example provided to dispose baggage lockers 64. These may receive outsized baggage which, in the aircraft of the prior art, are provided to travel in the hold of the aircraft. The presence of such baggage lockers thus makes it possible to compensate for the reduction in volume of the aircraft hold. In place of those lockers, it may also be envisioned to dispose additional seats adjacent the ramps.

At the rear of the aircraft, toilets 54 for the passengers may for example be provided. Toilets 54 are provided for the passengers traveling in the second zone 12 of the first deck and others for the passengers traveling on the second deck 22. These toilets 54 may be disposed with an offset in height and an overlap as illustrated in particular in FIG. 7. The toilets 54 may be accessed either from the second deck 22 or the second zone 12, or from the corresponding ramps 24.

It is also provided to dispose other baggage lockers 64, adjacent the ramps 24, at the rear of the aircraft, to receive in particular bulky baggage (or else seats, not represented).

Aft of the rear door 21, sites 62 may be provided to receive disabled persons. A space may also be provided at that location to receive galleys, stowage spaces, a bar, etc. or even freight. Seats may also be disposed at that location. They have the advantage that the passengers installed on those seats profit from a large free space in front of them (a lot of legroom). Such places may for example be attributed in priority to families with children.

FIG. 9 schematically illustrates a variant embodiment of the invention. The representation here is a very schematic side view of a medium-haul aircraft. The wing 8, and various doors of the aircraft have been represented here. In this example, it has been chosen to adapt an existing aircraft structure in which all the doors are disposed on a single deck. In this embodiment, a configuration such as that described earlier is again adopted. It is adapted as follows: the first zone 10 of the first deck is disposed between the first door 16 and a first intermediate door 52. Between that first intermediate door 52 and a second intermediate door 52, are located the second zone 12 of the first deck as well as a second deck 22 and the corresponding ramps 24. Between the second intermediate door 52 and the rear door 21, are located the third zone 14 of the first deck. The first zone 10 and the third zone 14 are advantageously arranged here to receive passengers and thus comprise corresponding seats. According to the diameter of the fuselage and the seats chosen, it is possible to have a variable number of passengers in the different zones of the aircraft. Taking into account the safety standards, concerning in particular the evacuation of an aircraft, it is possible to receive a maximum of 440 passengers, in a distribution each time providing for a maximum of 110 passengers, in the first zone 10, in the second zone 12, in the third zone 14 and on the second deck 22. Such a configuration requires the presence of four pairs of type A exits.

FIG. 10 is a similar view to the view of FIG. 9 for a long-haul aircraft having a larger wing 8. There are also four doors here in the configuration represented. It is possible to provide for 110 passengers on each of the second decks 22 and 110 other passengers in each of the second zones 12. Provision is also made to install at most 110 passengers on the intermediate plateau 38 with for example a fifth door (of type A) on that plateau. Otherwise, as illustrated in FIG. 10, the space 38 may be used for services. A maximum number of passengers is thus attained for such a configuration of 550 passengers (with five doors).

Lastly, FIG. 11 illustrates the wide variety of forms that the floors may take in particular on the second deck 22. As indicated above, these floors are preferably produced by molding a carbon-based composite material. The molded part has a profiled form and the cross-sections of that profiled form are shown in FIGS. 11A to 11G. FIGS. 11A and 11F correspond to substantially planar decks. There can be recognized for example in FIG. 11B the profiled cross-section of the second deck of FIG. 2. These various forms are given solely by way of example in order to illustrate that the present invention may adapt to numerous configurations and is thus highly modular, and are not exhaustive.

Figure 12:
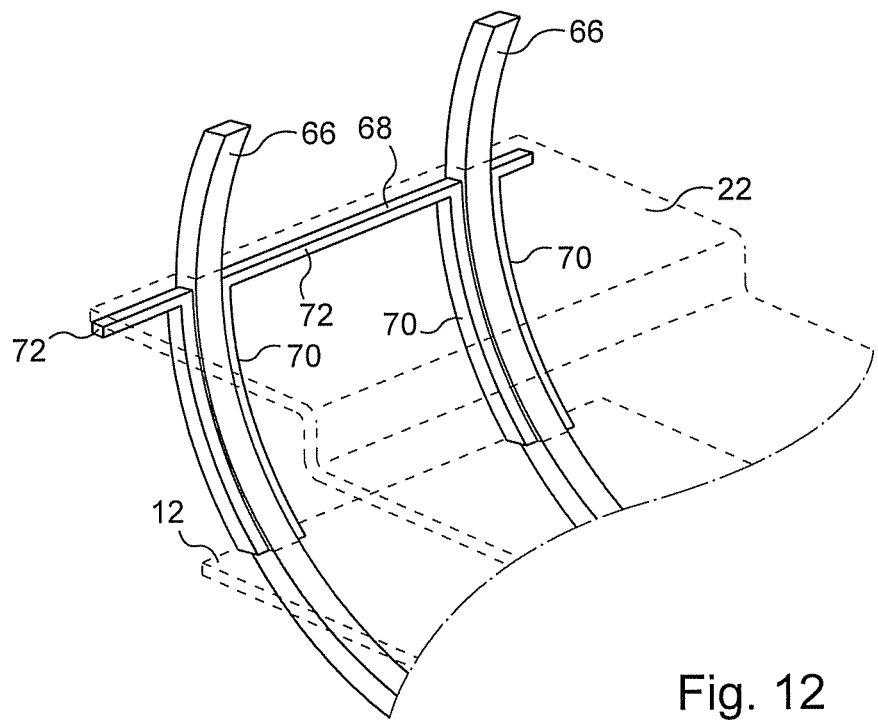
FIG. 12 is a schematic view illustrating an example of integration of an upper deck in the structure of an aircraft according to the invention.

FIG. 12 illustrates how a floor such as those illustrated in FIGS. 11A to 11G may locate in the aircraft. In that FIG. 12 two successive frames 66 can be recognized. As the person skilled in the art knows, the primary structure of an aircraft has annular frames linked by longerons which thus form the "framework" of the aircraft on which is fastened the outer skin and which bears all the structures inside the fuselage.

The second zone 12 of the first deck is for example mounted on the frames 66 in a conventional manner, using for example cross-members (not shown). It is provided here to have the floor of the second deck 22 rest on the first deck as illustrated in FIG. 12. For greater clarity, the floors corresponding to the first deck and to the second deck are represented in dashed line in this FIG. 12.

The floor of the second deck 22 rests on support stirrups 68 which form intermediate parts between the first deck and the second deck. Each support stirrup 68 has two branches 70 which each extend along a frame 66, while being fastened to it and resuming its shape so that the branches 70 are well-integrated with the structure of the aircraft. The free end of each branch 70 rests on the floor corresponding to the second zone 12 of the first deck and is fastened for example using a shoe—not represented. The two branches 70 are joined together by a base 72 which forms the actual support of said floor of the second deck 22. The base 72 extends longitudinally between two successive frames 66 and thereby forms a shoulder upon which an edge of the floor of the second deck 22 comes to rest. The floors of the second deck are thus longitudinally supported. The transverse support is provided by the floor itself. This floor is produced in sections each extending for example over two or three frames and each section fitting into neighboring section so as to provide mutual transverse support.

Figure 13:
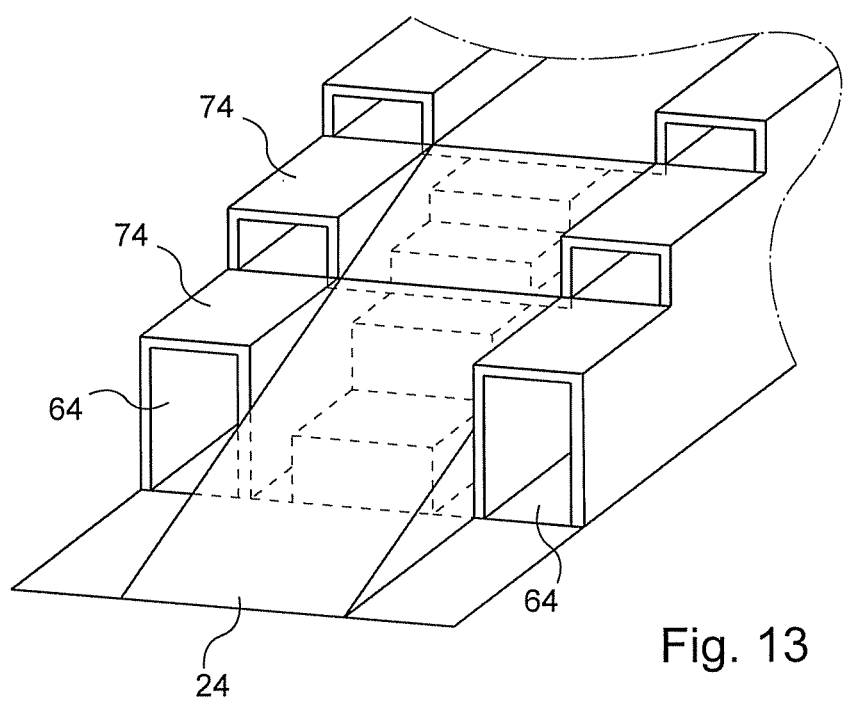
FIG. 13 illustrates a complex molded structure which may be integrated into an aircraft according to the invention.

FIG. 13 illustrates a part of complex form, capable of being molded in the same material as the floors of the second deck 22 to produce a ramp 24 and an arrangement around it, comprising for example baggage lockers 64. In the embodiment of FIG. 13, baggage lockers 64 are provided on each side of a ramp 24. Dashed lines illustrate that it may be envisioned for example to have a stairway over a given width associated with a neighboring ramp. The opening of the baggage lockers 64 is here such that the items of baggage are inserted longitudinally (relative to the direction of travel of the aircraft) into the lockers. As a variant a lateral opening may be provided for the baggage lockers 64 so as to be able to provide for transverse insertion of the items of baggage therein. The upper face 74 of the lockers may then for example be used to receive a seat, or else a space for stowing coats, a display unit, etc.

FIGS. 14A to 14D illustrate sections of fuselage of an aircraft able to transport fifteen passengers abreast on two levels with three access passageways, or aisles 20, around the ramps 24 in an aircraft whose fuselage has for example a height of 6.1 m and a width of 6.0 m.

Figure 14A:
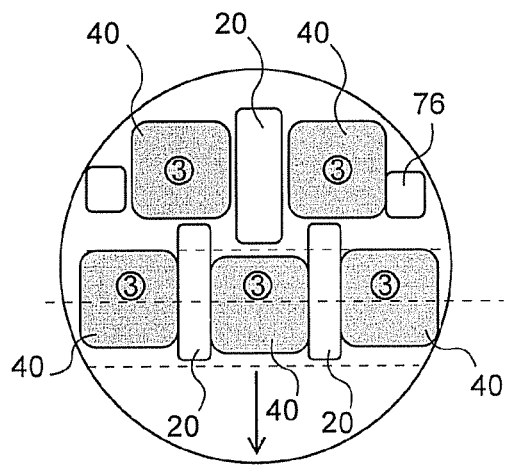
FIGS. 14A to 14D are transverse cross-sections of an aircraft fuselage according to the present invention at different longitudinal positions along the same ramp.

FIG. 14A corresponds to a transverse cross-section at the top of a ramp 24 or else in a portion of fuselage comprising a second deck 22. On the first deck, three sets 40 of three columns of seats are distributed and two aisles 20 separate the groups 40 pairwise. On the second deck, two groups 40 of three columns of seats are separated by an aisle 20. Laterally, stowage spaces 76 enable baggage to be received belonging to passengers traveling on the upper deck.

Figure 14B:
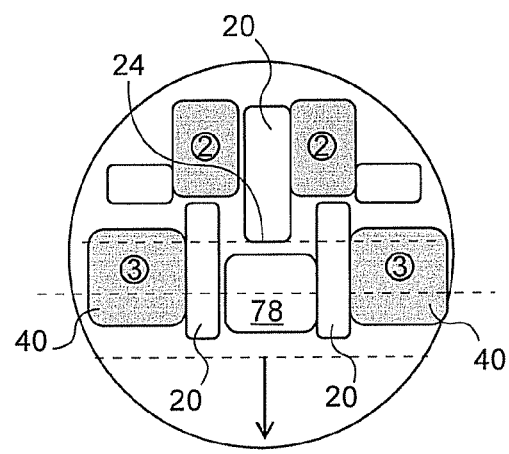
Figure 14C:
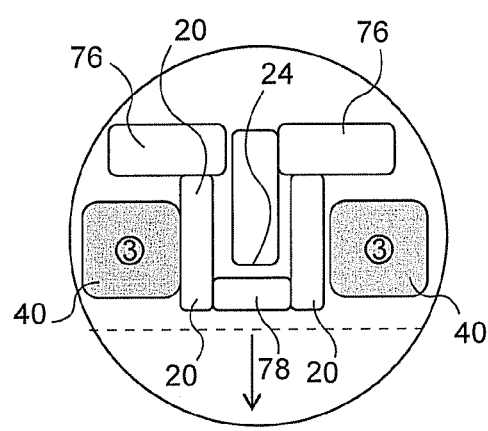
Figure 14D:
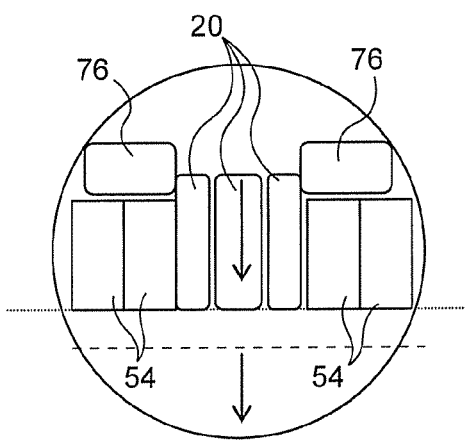

FIG. 14B is a cross-section taken at the location of a ramp 24, for example at 1 m from the upper end of the ramp 24 enabling access to the second deck 22. In this zone, the fuselage of the aircraft narrows slightly and it is provided only to have ten passengers abreast. On the lower deck, on account of the ramp 24 it is no longer possible to comfortably receive passengers in the center of the fuselage. The space available under the ramp 24 is then taken advantage of to form a storage compartment 78 in order to receive in particular baggage of passengers traveling in the second zone 12 of the first deck. The lateral groups 40 of the lower deck are not affected by the ramp and thus still receive three passengers abreast. At the upper level, on account in particular of the narrowing of the dimensions of the fuselage, two passengers travel abreast on each side of the ramp. On account of this, the lateral stowage space 76 may be increased.

On further descending the access ramp to the second deck (FIG. 14C), 1.6 meters further on, the places for passengers at the upper level have disappeared since it is no longer possible to obtain access thereto but the space is taken advantage of to further enlarge the stowage space 76. At the lower level, the configuration remains similar but the height of the stowage compartment 78 lessens.

At the bottom of the ramp for access to the second deck (FIG. 14D), it is chosen no longer to have passengers travel but to use the space for the stowage of trolleys or for producing toilets 54. The stowage space 76 then advantageously continues over the trolleys or the toilets.

As shown by the preceding description, relative to a fuselage of the prior art, and for the same diameter or equivalent cross-section, over a given length, the present invention enables a higher number of passengers to be accommodated without however doing this to the detriment of their comfort. The present invention also adapts to the structure of the aircraft (wing, position of the doors, etc.).

As regards the comfort of the passengers, for example in economy class, seats may be provided having a width of the order of 0.5 m disposed in the longitudinal direction with a pitch of 0.8 m to 0.85 m with 1.50 m of vertical clearance. As regards the aisles these have a width for example of 0.5 m and a height at least equal to 2 m. The complex form in particular of the second deck enables these various values to be provided for all the seats and at the location of all the aisles.

The various solutions provided in the preceding description and in the accompanying drawings, enable each passenger, when seated, to have to say "excuse me" to at most one neighbor to be able to leave his or her seat (no "double excuse-me"). On this point, the configurations provided are more comfortable than most of the configurations provided in the aircraft of the prior art.

The person skilled in the art will have also noted that a lot of space is available in the cabin to receive the baggage of the passengers. In the configurations represented in the drawings, it may be ensured for each passenger to have enough space to accommodate a standard suitcase with wheels, commonly called a roller case, of 115 or 125 cm. Additional stowage spaces are also provided. This also enables the comfort of the passengers to be improved who may bring more items of baggage with them into the cabin and thus no longer need to deposit them prior to embarkation for them to be registered in the hold. For small bags, handbags, articles of clothing, etc. it is possible to provide solutions. The above description provides not only shelves 36 but also stowage spaces 48. As regards the baggage compartments 64, these are provided for items of baggage of larger size, which may possibly also travel in the hold.

The space adjacent the ramps is not lost space. Large volumes of space available around the rectilinear ramps may be used, as indicated above, for toilets, the stowage of trolleys and/or of baggage. It may also be used to receive additional seats.

When the aircraft stops over at an airport, the ground service is the same as for a single deck aircraft of the prior art. The passengers embark and disembark at the front left of the aircraft. If the aircraft parks at a station in the open, stairs may be provided at the front and at the rear left of the aircraft. As regards the access for cleaning or commissary vehicles and the loading of the holds, this is obtained on the right of the aircraft.

The solution provided by the present invention enables a much more efficient flow of passengers than with an single deck aircraft with two (or three) aisles. More particularly, in the zones where there are two decks, the flow of passengers is optimized enabling freer movement of the passengers (greater number of aisles available). Furthermore, for a given number of passengers, the present invention makes it possible to have a relatively short cabin. Such a structure—short—makes it possible for example to group together the trolleys at the front of the cabin and the toilets at the rear thereof.

As shown by the preceding description, the present invention also enables disabled passengers or unaccompanied children (usually called UMs) to be received in good conditions and close to the cabin crew. A reserved zone may be provided for these travelers.

As regards movement once again, the slope of the ramps is compatible with an easy ascent or descent of the passengers in complete safety, either in normal embarkation and disembarkation mode, or at the time of an evacuation of the aircraft.

The concept provided above is more particularly adapted for aircraft having a short fuselage. More particularly it makes it possible to have 250 passengers travel in an aircraft of approximately 39 m long (corresponding to the length of an aircraft commercialized under the trademark A320). The innovative configuration provided enables the aircraft to be made compatible with the layouts of the various current airports while minimizing the stopover time and at the same time limiting the area of the parking place. Of course, the concept provided may also be used for aircraft of larger form, as illustrated in the drawings, always however with a concern for compactness.

As regards the capacities of the aircraft, with the present invention it may be envisioned to have the features described below.

For a cross-section making it possible to have ten passengers travel abreast, and with a distance between the two main doors of 18 m, a length of the ramps of 3 m (one ramp—or several—at the front and one ramp—or several—at the back) and without having to provide additional exits, the capacity in number of seats (economy class, pitch of 32 inches between two seats) is then 170 seats if ten seats adjacent each ramp are counted in addition (i.e. twenty seats), all of this being provided in a fuselage of 32 m.

By providing additional exits, still for ten passengers abreast, but with 25 m between the main doors, with ramps 3 m in length, it is possible to have 260 passengers travel in a fuselage of 39 m length with ten passengers adjacent the front ramps and ten adjacent the rear ramps.

For an aircraft having a fuselage of larger diameter, enabling fourteen passengers abreast to travel, it is possible with a fuselage length of 39 m to have 316 passengers travel (in economy class, pitch of 32 inches between two seats) and accommodating 22 passengers adjacent the front ramps and 22 passengers adjacent the rear ramps (ramps of 4 m). A configuration with sixteen passengers abreast enables 344 seated passengers to travel in a fuselage of 39 m length.

Naturally, the present invention is not limited to the various embodiments described above by way of non-limiting example or to the variants referred to. It also concerns all the embodiments within the capability of the person skilled in the art in the context of the claims given below.

The invention claimed is:

1. An aircraft cabin enabling passengers to be received, the aircraft cabin comprising:
   a first deck for receiving passengers,
   a second deck for receiving passengers, which is placed over the first deck, the second deck having a floor structure comprising a complex profiled form with different longitudinally extending zones disposed at different levels, at least one longitudinally extending zone forming an aisle located adjacent to at least one contiguous longitudinally extending zone and being disposed at a lower level than the at least one contiguous longitudinally extending zone, at least one access door disposed on a side wall of the aircraft cabin, wherein the first deck has at least one first zone comprising a planar area that extends substantially between the side wall of the aircraft cabin comprising the at least one access door to an opposite side wall of the aircraft cabin, the first zone being devoid of passenger seats and being situated on a same level as the access door, whereby the planar area of the first zone is configured as a passage and/or service zone, at least one second zone having a floor offset in height relative to the first zone, and at least one third zone having a substantially planar area located offset in height relative to the second zone of the first deck, and wherein at least one first rectilinear ramp directly links the first zone of the first deck to the second zone of the first deck, and at least one second rectilinear ramp directly links the first zone of the first deck to the second deck.

2. The aircraft cabin according to claim 1, wherein each ramp has a slope comprised between 10 and 30%.

3. The aircraft cabin according to claim 1, delimited by a fuselage, wherein the second zone of the first deck and the second deck comprise columns of seats against the fuselage.

4. The aircraft cabin according to claim 1, wherein the second zone of the first deck comprises two aisles each separating a lateral zone of seats and a central zone of seats.

5. The aircraft cabin according to claim 1, wherein the third zone and the first zone are both located at substantially a same level.

6. The aircraft cabin according to claim 1, wherein the longitudinally extending zones are planar and are linked by substantially vertical walls.

7. The aircraft cabin according to claim 6, wherein a difference in the level between the at least one longitudinally extending zone forming the aisle and the at least one contiguous longitudinally extending zone receiving seats is less than 0.60 m.

8. The aircraft cabin according to claim 1, wherein the floor structure of the second deck is a molded structure produced in a carbon-based composite material.

9. The aircraft cabin according to claim 6, wherein the second deck rests on intermediate parts which are disposed laterally and which bear on the first deck.

10. The aircraft cabin according to claim 1, wherein the floor having the complex profiled form has at least three longitudinally extending zones each having a different level to that of another zone considered.

11. The aircraft cabin according to claim 1, wherein the floor having the complex profiled form has transverse stiffeners.

12. The aircraft cabin according to claim 1, wherein an available height between the second zone of the first deck and the second deck is comprised between 1.20 m and 2.20 m.

13. The aircraft cabin according to claim 1, wherein the second zone of the first deck has a substantially planar floor.

14. An aircraft adapted for the transport of passengers, comprising an aircraft cabin according to claim 1.

15. The aircraft according to claim 14, wherein the third zone is situated at a rear of the aircraft.

16. The aircraft according to claim 14, comprising a wing, wherein the third zone is situated above the wing of the aircraft.

17. The aircraft according to claim 16, wherein above the wing and aft thereof, the first deck also has a configuration having the first zone, the second zone and the third zone, the second zone being offset relative to the first zone and to the third zone.

18. The aircraft according to claim 14, the aircraft having a fuselage whose equivalent diameter is greater than 4.50 m.

19. The aircraft cabin according to claim 1, comprising two first rectilinear ramps that directly link the first zone of the first deck to the second zone of the first deck, the at least one second rectilinear ramp being disposed in between the two first rectilinear ramps relative to the first zone.

20. An aircraft cabin enabling passengers to be received, the aircraft cabin comprising:

a first deck for receiving passengers, a second deck for receiving passengers, which is placed over the first deck, the second deck having a floor structure comprising a complex profiled form with different longitudinally extending zones disposed at different levels, at least one longitudinally extending zone forming an aisle located adjacent to at least one contiguous longitudinally extending zone and being disposed at a lower level than the at least one contiguous longitudinally extending zone, at least one access door disposed on a side wall of the aircraft cabin, wherein the first deck has at least one first zone comprising a planar area that extends substantially between the side wall of the aircraft cabin comprising the at least one access door to an opposite side wall of the aircraft cabin, the first zone being devoid of any passenger seats and being situated on a same level as the access door, at least one second zone having a floor offset in height relative to the first zone, and at least one third zone having a substantially planar area located offset in height relative to the second zone of the first deck, and wherein at least one first rectilinear ramp directly links each of the first zone of the first deck and the third zone of the first deck to the second zone of the first deck, and at least one second rectilinear ramp directly links each of the first zone of the first deck and the third zone of the first deck to the second deck, whereby the planar area of both the first zone and the third zone is configured as a passage and/or service zone.

* * * * *